United States Patent
Wang

(10) Patent No.: US 7,054,622 B2
(45) Date of Patent: May 30, 2006

(54) METHOD FOR REFRESHING FLASH MEMORY OF A CELLULAR PHONE

(75) Inventor: Feng-Yi Wang, Tao-Yuan (TW)

(73) Assignee: BenQ Corporation, Tao-Yuen Hsien (TW)

( * ) Notice: Subject to any disclaimer, the term of this patent is extended or adjusted under 35 U.S.C. 154(b) by 325 days.

(21) Appl. No.: 10/604,720

(22) Filed: Aug. 13, 2003

(65) Prior Publication Data

US 2004/0110498 A1    Jun. 10, 2004

(30) Foreign Application Priority Data

Aug. 16, 2002    (TW) .................................. 91118589

(51) Int. Cl.
*H04M 3/00*    (2006.01)
(52) U.S. Cl. ........................................ 455/418; 455/88
(58) Field of Classification Search ................ 455/418, 455/419, 425, 557, 559

See application file for complete search history.

(56) References Cited

U.S. PATENT DOCUMENTS

| | | | |
|---|---|---|---|
| 5,249,218 A | | 9/1993 | Sainton ....................... 455/418 |
| 6,529,747 B1 | * | 3/2003 | Toba ........................... 455/563 |
| 6,879,847 B1 | * | 4/2005 | Kato et al. .................. 455/566 |
| 2002/0004386 A1 | * | 1/2002 | Simon ......................... 455/419 |

* cited by examiner

*Primary Examiner*—George Eng
*Assistant Examiner*—Julie E. Stein
(74) *Attorney, Agent, or Firm*—Winston Hsu

(57) ABSTRACT

A method for transmitting data from a first cellular phone to a second cellular phone is provided. The first cellular phone includes a first flash memory having a transmitting program code, a receiving program code, and an application program code. The second cellular phone includes a second flash memory, and a random access memory (RAM). The method includes transmitting the receiving program code to the RAM of the second cellular phone and then transmitting the application program code to the second flash memory of the second cellular phone. Thus, the flash memory of the second cellular phone is refreshed by the first cellular phone.

8 Claims, 5 Drawing Sheets

METHOD FOR REFRESHING FLASH MEMORY OF A CELLULAR PHONE

BACKGROUND OF INVENTION

1. Field of the Invention

The present invention relates to a method for refreshing a flash memory of a cellular phone, more specifically, a method of directly refreshing a flash memory of a cellular phone with another cellular phone.

2. Description of the Prior Art

In recent years, the rapid development of wireless communications has made cellular phones indispensable products. As mobile communications enters the age of 3G, high-speed and wide-bandwidth wireless communications become a must of the cellular phone. Mobile computers, personal digital assistants (PDAs), and notebook PCs, requiring wide bandwidth, can wirelessly connect to the Internet by using cellular phones. Even cellular phones themselves have similar functions to PDAs and personal computers due to developments in technology such as small-size color liquid crystal displays (LCDs), low power consumption but high-performance system on chip (SOC) devices, and large-volume non-volatile flash memory chips.

Accordingly, present cellular phones not only receive and send signals but also have advanced functions such as displaying high-resolution photos and video games by using an LCD, connecting to the Internet to browse web pages, and playing various video and audio formats. Therefore, besides a embedded high-performance but low power consumption microprocessor, cellular phones further require large-volume memory for storing program codes and data to satisfy these functions.

However more software, programs, and data being stored inside cellular phones results in a need to update firmware, in order to correct programming errors and to support new functions provided by suppliers or designers. Therefore, before selling cellular phones or returning a cellular phone with updated firmware to a user, manufacturers and vendors have to update the program code and data stored in flash memory. In some cases, technicians have to reprogram the stored content in the flash memory for a malfunctioned cellular phone. Each above action requires a refresh of the flash memory of the cellular phone.

The conventional method for updating a flash memory of a cellular phone is to utilize a personal computer connected to a port of a cellular phone via an RS-232 transmission line to transmit and update data to the flash memory of the cellular phone. Please refer to FIG. 1. FIG. 1 is a schematic diagram of a conventional PC 10 refreshing a flash memory 16 of a cellular phone 12. An RS232 transmission port 11 of the PC 10 is connected with an earphone jack 13 of the cellular phone 12 through an RS232 transmission line 14. Because the operation voltage of the transmission port 11 is 7~9 V and that of the earphone is 3.7V, no matter if the transmission signal is from the cellular phone 12 to the PC 10 or from the PC 10 to the cellular phone 12, the transmission signal has to be raised or reduced in voltage through a transformer 14 and then be sent.

Before transmitting data to the cellular phone 12, the PC 10 has to be installed with operation software, operating system (OS), and bin files to be transmitted to the flash memory 16 of the cellular phone 12. The user has to start the OS of the PC 10 so that the operation software is capable of being executed. Because the operation voltage and execution efficiency of the transmission port 11 are not the same as those of the earphone port 13, voltage-transformation and synchronization in communication protocols of the both ends are required before the synchronous transmission starts.

After setting synchronous transmitting, the operation software of the PC 10 sends a client program to a random access memory (RAM) 19 of the cellular phone 12 and then transmits the bin files to the flash memory 16. While transmitting the bin files to the flash memory 16, the PC 10 performs the following:

(a) The PC 10 continues to transmit the bin files to the flash memory 16 of the cellular phone 12 from the interruption of the previously transmitted bin files. Of course, if step (a) is executed for a first time, the transmission starts from the beginning of the bin files to the flash memory 16. The transmitted data from the PC 10 is first stored in a buffer 15 of the RAM 19 within the cellular phone 12 instead of being directly stored in the RAM 19 until the buffer 15 is filled.

(b) The cellular phone 12 writes fragments of the bin files in the buffer 15 into the flash memory 16 based on the formats of the bin files and addresses of the flash memory 16 accordingly. If the bin files have been transmitted completely after this step, the transmission action is ended; if only parts of the bin files have been transmitted, then repeat step (a).

If the highest baud rate available to RS-232 transmission line is 115200 bit/s (14.4 kByte/s), and a volume of the flash memory 16 is about 3 Mbytes, a total transmission time (excluding actually writing the bin files to the flash memory 16) is at least 200 seconds.

In addition, even though there are usually two transmission ports (such as serial ports) on the PC 10, the two ports typically share the same bandwidth (that is, 115200 bit/s). That means that if an operator wants to completely refresh two cellular phones 12 at the same time in the same PC, he cannot double the efficiency. And refreshing cellular phones via a number of computers results in excessive expense. Moreover, the refreshing action must be controlled by the PC 10, meaning that while refreshing a plurality of cellular phones, the PC 10 comparing to the cellular phones, consumes more energy and thus results in increasing costs. Meanwhile, during transmission by the serial port, if a bin file being transmitted is very large, the PC 10 can be too burdened to perform other programs. Hence, utilizing the prior art method to refresh a plurality of cellular phones leads to lower efficiency and higher cost.

SUMMARY OF INVENTION

It is therefore a primary objective of the claimed invention to solve the above-mentioned problems by providing a method of refreshing a flash memory of a first cellular phone that is directly connected to a second cellular phone via a transmission line, so that the transmission speed and efficiency of refreshing cellular phones is increased.

Briefly summarized, the claimed invention provides a first cellular phone comprises a first flash memory having a transmitting program code, a receiving program code, and an application program code; and a second cellular phone comprises a second flash memory and a random access memory (RAM). The method comprisestransmitting the receiving program code to the RAM of the second cellular phone, and transmitting the application program code to the second flash memory of the second cellular phone. Therefore, another two cellular phones can be refreshed by the first and second cellular phones in the above-mentioned manner. In this way the refreshing efficiency can be doubled achieving low cost and high efficiency.

These and other objectives of the claimed invention will no doubt become obvious to those of ordinary skill in the art after reading the following detailed description of the invention, which is illustrated in the various figures and drawings.

DETAILED DESCRIPTION

Figure 1:
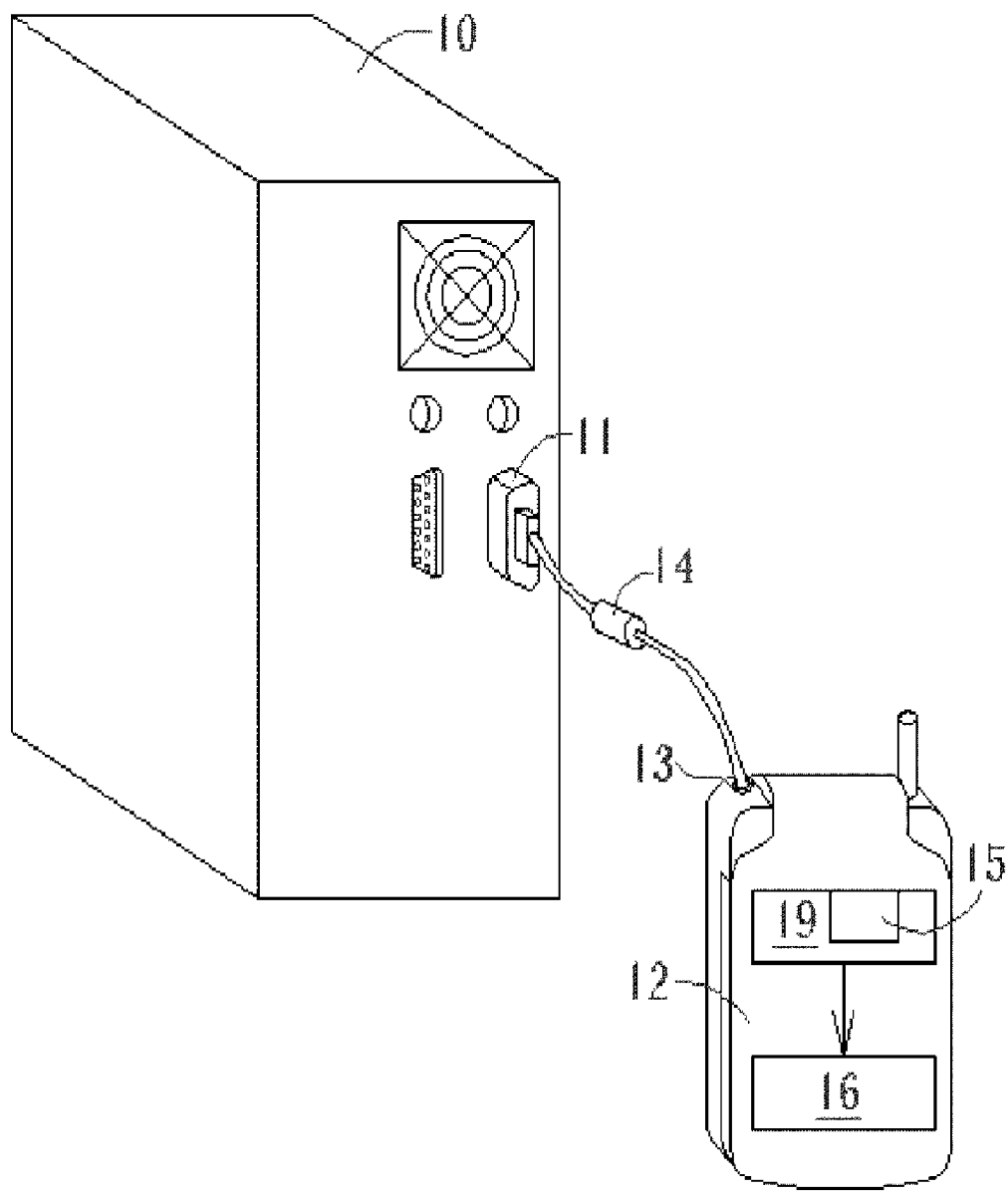
FIG. 1 is a schematic diagram of a conventional method for refreshing a flash memory of a cellular phone via a PC.
Figure 2:
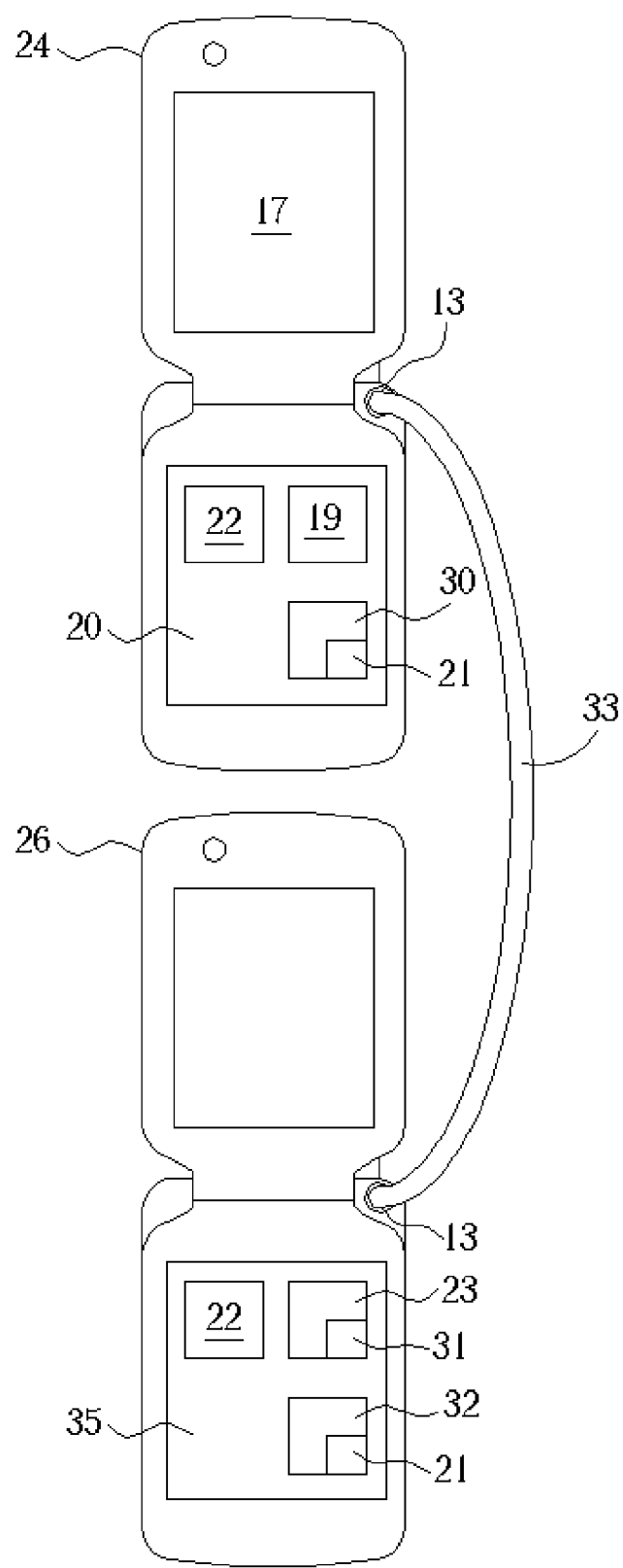
FIG. 2 is a schematic diagram of transmitting data from a first cellular phone to a second cellular phone.

Please refer to FIG. 2 showing a schematic diagram of transmitting data from a first cellular phone 24 to a second cellular phone 26. The transmission line 33 is plugged into each earphone jack 13 of the first cellular phone 24 and the second cellular phone 26. The first cellular phone 24 comprises a system on chip 20, in which the first cellular phone 24 has a CPU 22 and a flash memory 30. The flash memory 30 stores a boot ROM 21, a transmitting program code, a receiving program code, and an application code. The second cellular phone 26 comprises a system on chip 35, in which the second cellular phone 26 has a CPU 22, a RAM 23, and a flash memory 32. The RAM 23 comprises a buffer 31. The flash memory 32 stores a boot ROM 21 and an application code.

The system on chip 20, 35 being kernels of the cellular phones 24, 26 are in charge of executing programs and processing digital communication data. The CPU 22 is guided to an address of a next command based on a program counter, and fetches this command. Then, the CPU 22 decodes, executes, and performs the command to provide a corresponding function.

The RAM 23 is used by the application code stored in the flash memory 32 of the second cellular phone 26. While an operator executes the application code, the second cellular phone 26 assigns and arranges essential data in the RAM 23, which is faster than the flash memory 32 allowing CPU 22 fetching commands to run more quickly.

The boot ROM 21 in the flash memory 30, 32 is used for initializing, testing components, and for selecting which mode is performed. The boot ROM 21 of the flash memory 30, 32 can also be established outside the SOC 20 and can be accessed by a system startup procedure.

Figure 3:
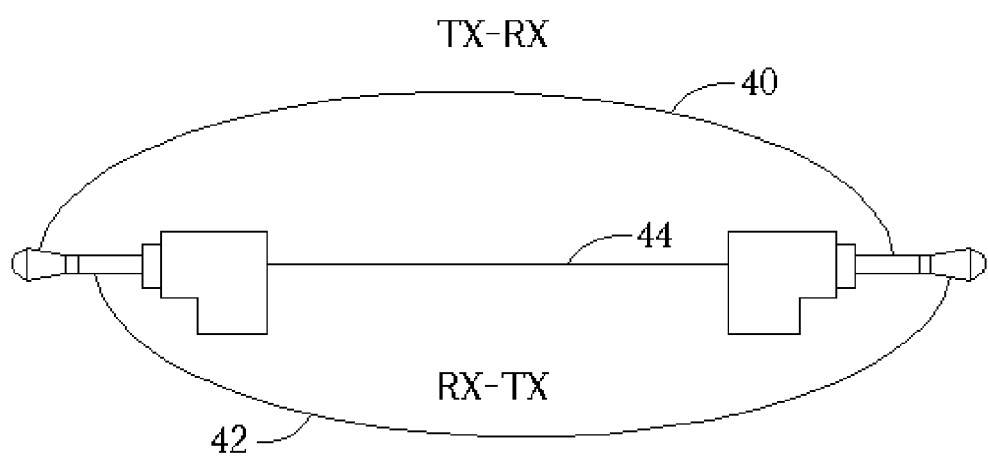
FIG. 3 is a schematic diagram of the transmission line shown in FIG. 2.

Please refer to FIG. 3 showing a schematic diagram of the transmission line 33 shown in FIG. 2. The transmission line 33 is a twisted pair cable that comprises a first data line 40 for transmitting data from the first cellular phone 24 to the second cellular phone 26, a second data line 42 for transmitting data from the second cellular phone 26 to the first cellular phone 24, and a ground line 44 connected between the first cellular phone 24 and the second cellular phone 26.

Figure 4:
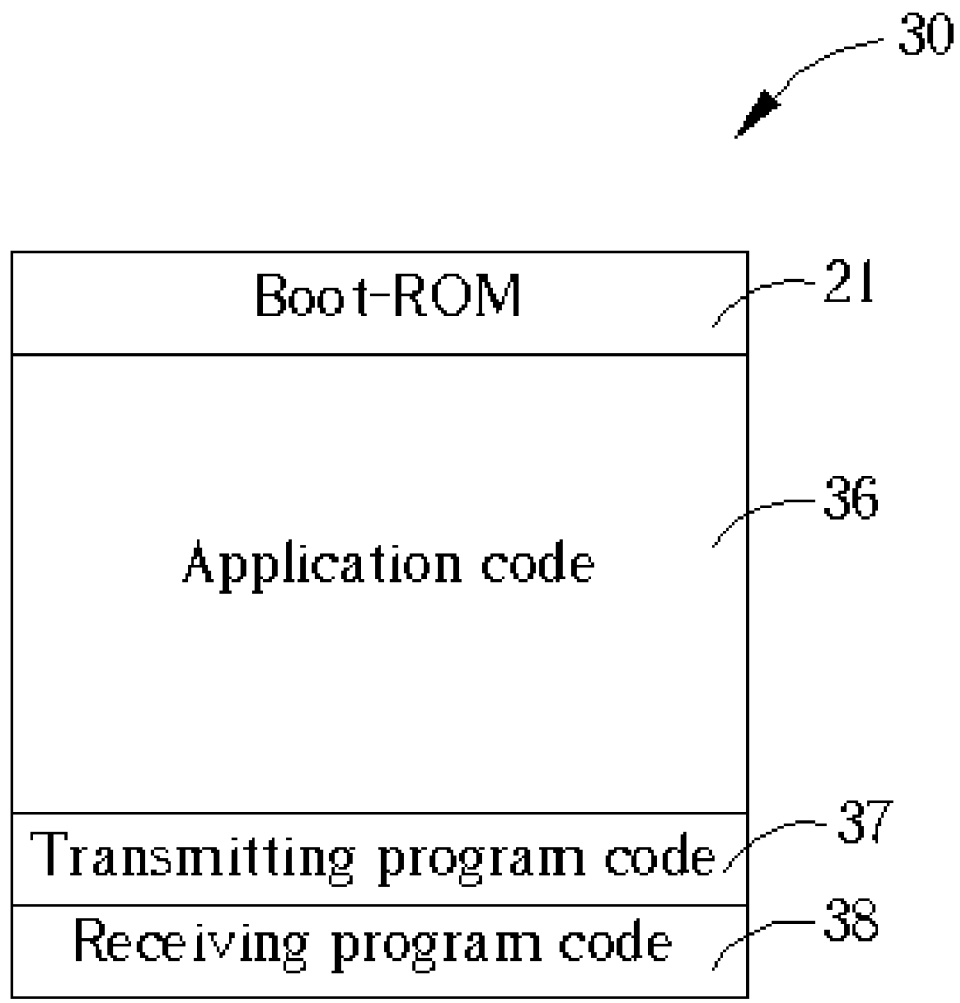
FIG. 4 is a schematic diagram of a flash memory of a system on chip of the first cellular phone storing data.

Please refer to FIG. 4 showing a schematic diagram of the flash memory 30 of the system on chip 20 of the first cellular phone 24 for storing data. The flash memory 30 comprises the boot ROM 21, an application code 36, a transmitting program code 37, and a receiving program code 38. The application code 36 stores a user's operating interface, games, and other fundamental operational codes. The purpose of the transmitting program code 37 is to replace the functions of a PC in the prior art. The transmitting program code 37 comprises an operating interface used for when the first cellular phone 24 enters a download mode, a communication protocol used for data-transmission between the first cellular phone 24 and the second cellular phone 26, and a driver code used for writing to the flash memory 32 of the second cellular phone 26 and for controlling other hardware devices. The receiving program code 38 comprises a required corresponding program code and an interface for receiving data from the first cellular phone after the second cellular phone 26 performs download procedures. The first cellular phone 24 is used to send bin files stored in the flash memory 30 to the flash memory 32 of the second cellular phone 26. Therefore, the first cellular phone 24 possesses the application code 36, the transmitting program code 37, and the receiving program code 38. The second cellular phone 26 is used to receive the bin files from the first cellular phone 24 such that the second cellular phone 26 simply receives the receiving program code 38 sent from the first cellular phone 24 before receiving the bin files. However, the first cellular phone 24 can also send the transmitting program code 37 together with the receiving program code 38 to the second cellular phone 26. With this, before distributing the second cellular phone 26, suppliers can simply open the application code 36 and the boot ROM 21 to consumers for use, and the remaining transmitting program code 37 and the receiving program code 38 can be disabled.

After starting the first cellular phone 24, an operator can enter a password to enable the transmitting program code 37, and thus the first cellular phone 24 enters the download mode. The operator can then transmit data via the transmitting program code 37 as shown on an LCD 17. Meanwhile, the first cellular phone 24 sends a download signal to the second cellular phone 26 through the transmission line 33, preparing to refresh the flash memory 32 of the second cellular phone 26. After switching on the second cellular phone 26, the boot ROM 21 initiates a start-up procedure in and checks whether the download signal is delivered from the first cellular phone 24, which is used to inform the second cellular phone 26 of executing the download mode. If the download signal exists, the second cellular phone 26 enters the download mode immediately; if not, the second cellular phone 26 completes the remaining normal start-up procedure and enters a normal mode. If the second cellular phone 26 successfully finds the download signal and enters the download mode, the transmitting program code 37 of the first cellular phone 24 sends the receiving program code 38 to the RAM 23 of the second cellular phone 26 over the transmission line 33. After successfully receiving the receiving program code 38, the CPU 22 of the second cellular phone 26 begins to perform the receiving program code 38 stored in the RAM 23. Meanwhile, the first flash memory 30 starts to overwrite the second flash memory 32. The first cellular phone 24 transmits all data and the application code 36 stored in the flash memory 30 in a bin file manner to the second cellular phone 26 via the transmission line 33 until the flash memory 32 is completely overwritten by the flash memory 30. Because voltages on two ends of the transmission line 33 are identical, the signals transmitted do not need intermediate processing. The execution efficiency of the two ends of the transmission line 33 is also identical so that the transmission rate can be performed under an operating clock of a cellular phone. In the present embodiment, one sixteenth of the operating clock of the cellular phone is used.

For example, the operating clock of the CPU 22 of the cellular phones 24, 26 is 13 MHz, the transmission rate can be easily determined as 812500 bit/s, i.e. about 100 kbyte/s. The transmission time is reduced by more than 8 times over the prior art.

Figure 5:
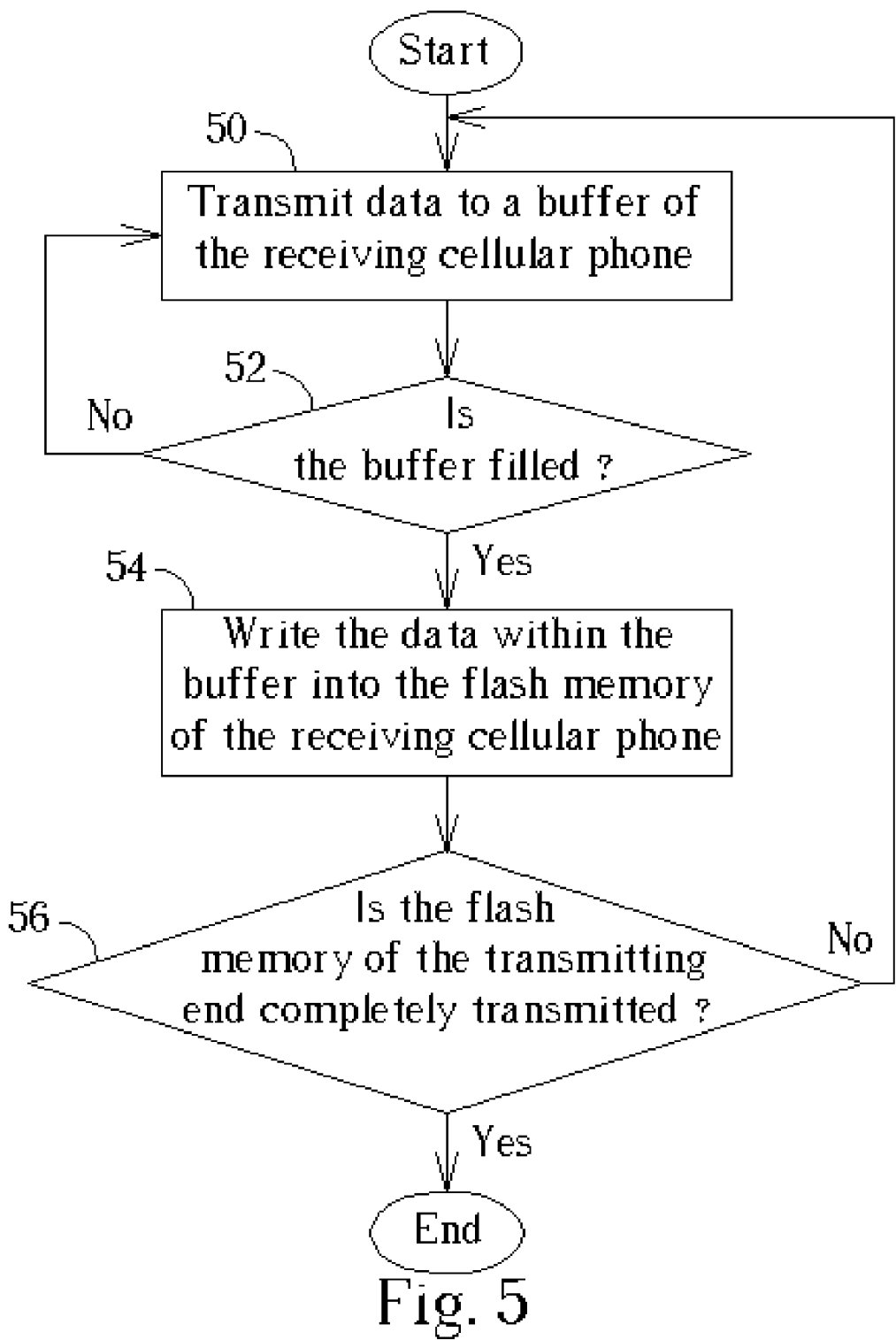
FIG. 5 is a flowchart of the first cellular phone refreshing a flash memory of the second cellular phone.

Please refer to FIG. 5 showing a flowchart of the first cellular phone 24 refreshing the flash memory 32 of the second cellular phone 26. When the two cellular phones enter the download mode, the following steps are executed:

Step 50: The first cellular phone 24 continues to transmit data to the second cellular phone 26 from the last interrupted location of the flash memory 30. Certainly, if this action is executed for a first time, it begins the transmission from the beginning of the bin files in the flash memory 30. The transmitted data from the first cellular phone 24 is stored in the buffer 31 of the RAM 23 instead of in the second flash memory 32 of the second cellular phone 26;

Step 52: Check whether the buffer 31 within the second cellular phone 26 is filled; if it is, go to step 54, if not, go back to step 50;

Step 54: At the moment, the second cellular phone 26 writes fragments of the bin files in the buffer 31 into the flash memory 32 based on formats of the bin files and addresses of the flash memory 32 corresponding to the bin files.

Step 56: Detect whether the data within the flash memory 30 of the first cellular phone 24 is completely transmitted; if it is, the transmission is ended, if not, go back to step 50.

According to the present invention, refreshing the flash memory of a cellular phone does not require a PC. Much like the way whichthe first cellular phone 24 refreshes the second cellular phone 26, two cellular phones couple with two transmission lines are capable of refreshing another two cellular phones. Similarly, four first cellular phones 24 are capable of refreshing another four second cellular phones 26. Theoretically, the refreshing rate of the present invention is twice than that of the conventional method. Moreover, the power consumption of a cellular phone is far less than a PC, which has more than 200W of power consumption but slowly refreshing one or two cellular phones at a time. In contrast to the prior art, the present invention can achieve cost reductions due to the high transmission rate, high efficiency throughtheoretically simultaneously refreshing unlimited cellular phones, and low power consumption.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for transmitting data from a first cellular phone to a second cellular phone; wherein the first cellular phone includes a first flash memory having a transmitting program code for controlling the transmission of data to another cellular phone, a receiving program code for controlling the receipt of data from another cellular phone, and an application program code for controlling operation of the first cellular phone; and the second cellular phone includes a second flash memory and a random access memory (RAM), the method comprising:
   (a) transmitting the receiving program code to the RAM of the second cellular phone; and
   (b) transmitting the application program code and the transmitting program code from the first flash memory of the first cellular phone to the second flash memory of the second cellular phone.

2. The method of claim 1 wherein both the application program code and the receiving program code in the first cellular phone are transmitted to the second cellular phone through a transmission line.

3. The method of claim 2 wherein the first cellular phone and the second cellular phone further comprises a port for connecting the transmission line.

4. The method of claim 3 wherein the port is an earphone jack.

5. The method of claim 1 wherein the second cellular phone further comprises a read only memory (ROM) for storing a boot code for executing a start procedure.

6. The method of claim 5 wherein the read only memory further stores a selecting procedure code for selecting to execute the boot code or to perform a download procedure during the start procedure execution so as to download both the receiving program code and the application program code stored in the first flash memory to the second cellular phone.

7. The method of claim 1 wherein the second flash memory stores a start procedure code for executing a start procedure of the second cellular phone.

8. The method of claim 7 wherein the second flash memory further stores a selecting procedure code for selecting to execute a boot code or to perform a download procedure during the start procedure execution so as to download both the receiving program code and the application program code stored in the first flash memory to the second cellular phone.

* * * * *